United States Patent [19]

Itoh

[11] Patent Number: 4,799,582

[45] Date of Patent: Jan. 24, 1989

[54] PALLET EXCHANGING APPARATUS FOR MACHINE TOOL

[75] Inventor: Saburo Itoh, Fukui, Japan

[73] Assignee: Matsuura Machinery Corporation, Fukui, Japan

[21] Appl. No.: 85,033

[22] Filed: Aug. 12, 1987

[30] Foreign Application Priority Data

Feb. 23, 1987 [JP] Japan ................... 62-037843

[51] Int. Cl.[4] ........................................... B65G 47/00
[52] U.S. Cl. .................. 198/346.1; 104/48; 104/162
[58] Field of Search ............... 198/346.1, 465.1, 465.2; 414/509; 29/563, 33 P; 104/162, 163, 165, 48, 50

[56] References Cited

U.S. PATENT DOCUMENTS

| | | | |
|---|---|---|---|
| 3,099,873 | 8/1963 | Brainard et al. | 198/346.1 X |
| 3,165,192 | 1/1965 | Wallis | 198/345 |
| 3,556,011 | 1/1971 | Saxonmeyer | 104/48 |
| 3,825,245 | 7/1974 | Osburn et al. | 29/563 X |
| 4,090,287 | 5/1978 | Selander | 29/563 X |
| 4,172,512 | 10/1979 | Clegg et al. | 29/33 P X |
| 4,480,738 | 11/1984 | Mattson | 29/563 X |
| 4,482,043 | 11/1984 | Bauman et al. | 29/33 P X |
| 4,498,571 | 2/1985 | Noruma et al. | 198/345 X |
| 4,512,068 | 4/1985 | Piotrowski | 29/563 X |
| 4,715,490 | 12/1987 | Date et al. | 198/346.1 |

FOREIGN PATENT DOCUMENTS

1272956 7/1968 Fed. Rep. of Germany ........ 104/48

Primary Examiner—Robert J. Spar
Assistant Examiner—Cheryl L. Gastineau
Attorney, Agent, or Firm—Jordan and Hamburg

[57] ABSTRACT

A pallet exchanging apparatus for machine tool used for exchanging the pallet loaded with the machined workpieces with the pallet loaded with the workpieces to be machined. The pallet exchanging apparatus has a transmission device for shifting the pallet between a work position on a table of the machine tool and a waiting position for exchanging the pallets. The transmission device is driven either by the movement of the table or the movement of the driving mechanism for the table and is adapted to output the rotational movement. The output of the transmission is used for driving a speed-up device. The speed-up device is adapted to move the pallet linearly with high speed and larger stroke than those of the linear movement of the table.

1 Claim, 7 Drawing Sheets

PALLET EXCHANGING APPARATUS FOR MACHINE TOOL

FIELD OF THE INVENTION AND RELATED ART STATEMENT

The present invention relates to an apparatus for exchanging pallets used for a machine tool.

A pallet exchanging apparatus used for machine tool is well known, the apparatus being adapted to shift the pallet between the first position where the pallet loaded with already machined work pieces are to be exchanged with the pallet loaded with workpieces to be machined and the second position where the workpiece or workpieces on the pallet are machined. The second position can be selected on the table of the machine tool for machining said workpieces.

Figure 9:
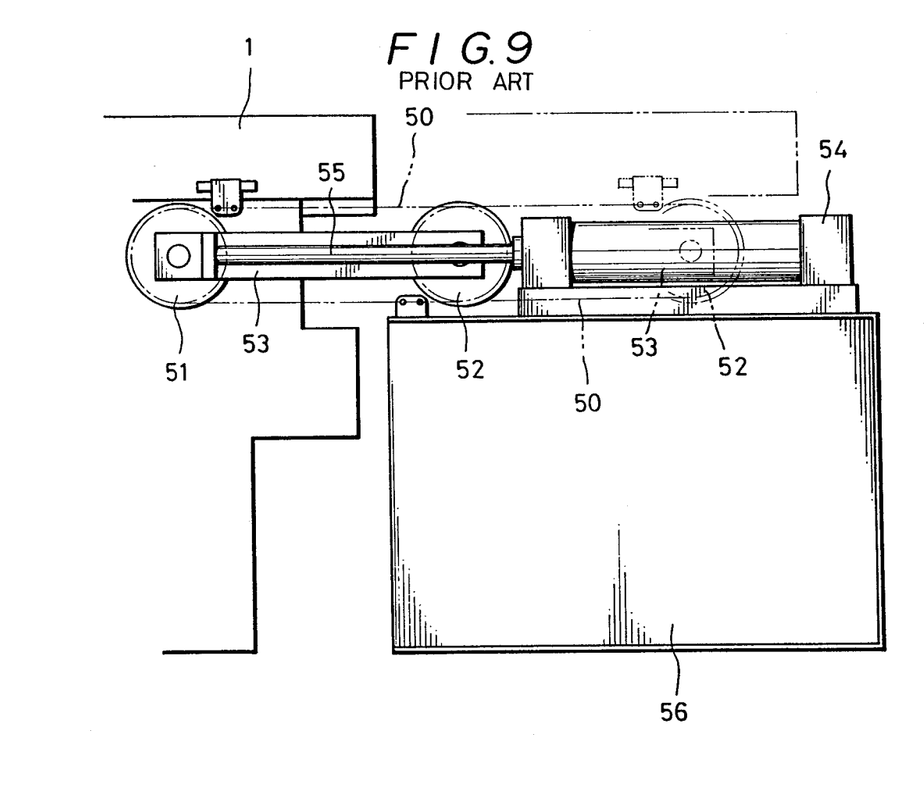
FIG. 9 and FIG. 10 are explanatory views of the driving device for a known pallet exchanging device.

In the pallet exchanging apparatus according to a prior art, such a shifting device is used wherein a chain 50 is secured to the pallet 1 as shown in FIG. 9, the sprockets 51, 52 with the chain 50 wound thereabout are rotatably supported by a frame 53 to which the rod 55 of a cylinder 54 is fixedly mounted, and a part of the chain 50 is secured to the frame 56 of the pallet exchanging apparatus to which the cylinder 54 is fixed. Operation of the cylinder 54 causes the rod 55 to be projected and retracted, so that the sprockets 51, 52 are moved and at this time rotation of the sprockets 51, 52 causes the pallet 1 to be reciprocated between the second position on the table as shown by a solid line and the first position as shown by a phantom line.

Figure 10:
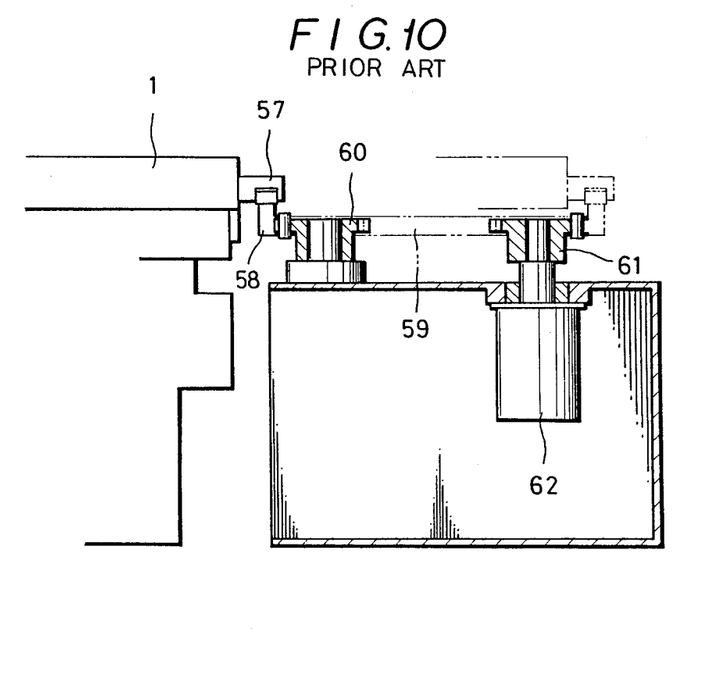

It is also to be noted from FIG. 10 that such a construction is also employed as pins 58 adapted to engage with the engaging part 57 provided on the pallet 1 are attached to the chain 59, the chain 59 is wound around the sprockets 60, 61 and the sprocket 61 is driven by the motor 62 so that the pallet 1 may be reciprocated between the second position on the table as shown by a solid line and the second position shown by a phantom line.

According to the above-explained pallet exchanging apparatus of a prior art, there have been such problems as a separate driving source is required for exchanging pallets, energy consumption is considerable, attachment as well as detachment of pallets are cumbersome and also exchanging the pallet loaded with machined workpieces with the pallet and the workpieces still to be machined requires a lot of work.

OBJECT AND SUMMARY OF THE INVENTION

The present invention has it as an object to provide a pallet exchanging apparatus which will eliminate the problems as above mentioned pertaining to a prior art and has simplified the constitution thereof.

The above-mentioned object has been attained by the present invention which provides a transmission device adapted to output the rotary motion from the rotary or linear motion provided by the driving means or the linear motion of the table itself in the machine tool, and a speed-up device adapted to transmit the rotary motion provided by the transmission device to the pallet as a higher speed and a larger stroke linear motion than those of the linear motion of the table.

Although the transmission device and the speed-up device are described as separate units in the claims of a relevant patent, they should not be limited to such separate units and they may be constituted as one unit and any device may be included in the device what is claimed as long as they are capable of shifting the pallets at a higher speed and a larger stroke than those of a table based on the linear motion of the table.

When pallets are to be exchanged, as the table is moved, a higher speed linear motion may be obtained as the output of the speed-up device or directly from the linear motion of the table. Since the output part of the speed-up device is coupled to a pallet, the pallet may be shifted at a higher speed than the shifting speed of the table and with larger strokes than that of the table. When the table has shifted to a specified position the pallet which has been loaded on the table will be moved to a first position or a waiting position lying outside of the table.

According to the present invention, since movement of the table itself of a machine tool or movement of a driving device for shifting the table are utilized to cause the pallets to be moved in relation to the table for exchanging the pallets, no separate driving device will be required, thereby simplifying the mechanism, reducing the cost and making synchronization of the movement of pallets with that of the table easier and more accurate. Since the motor for the machine tool in itself may be used so that the speed of exchanging the pallets which will be suitable for the particular size of workpieces may be selected. In this way, it has become unnecessary to provide an unnecessarily large motor for a workpiece exchanging device for a large workpiece which may not be frequently used.

DESCRIPTION OF THE PREFERRED EMBODIMENT

The present invention will now be explained in detail with reference to the embodiment shown in the accompanying drawings.

Figure 1:
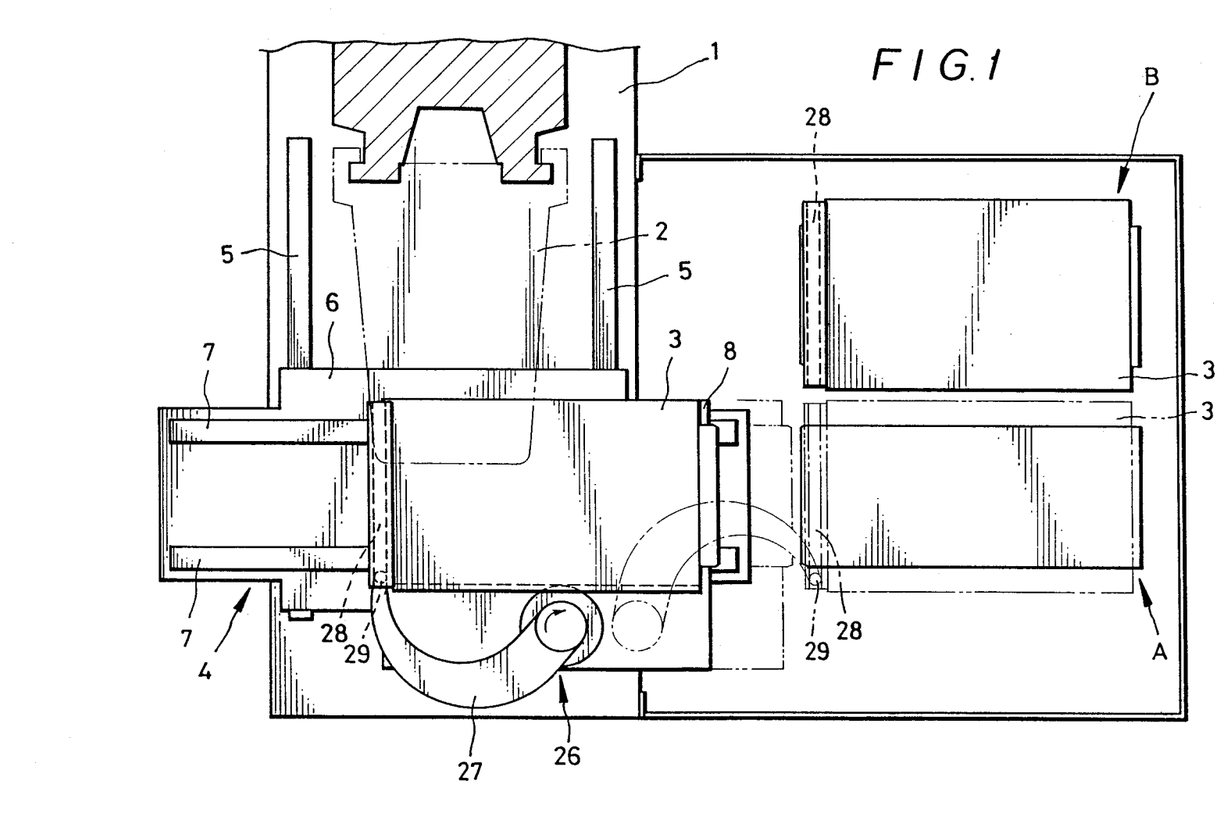
FIG. 1 is the plan view of the machine tool according to the present invention.
Figure 2:
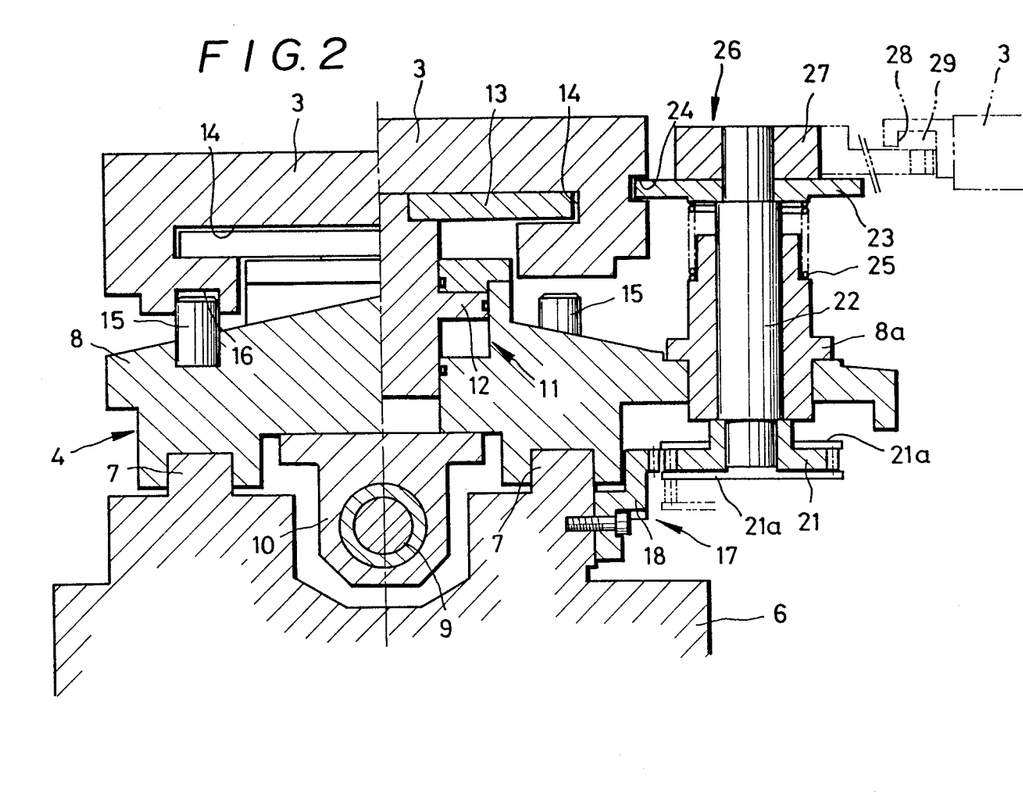
FIG. 2 is the left side elevation of a major part in FIG. 1.
Figure 3:
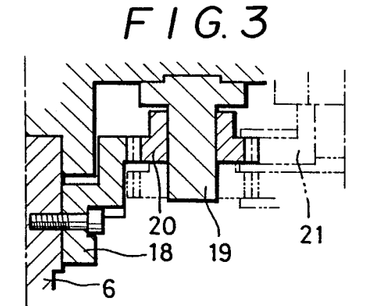
FIG. 3 is the sectional view showing a part of the gear train of transmission device.

In FIG. 1 and FIG. 2, workpiece or workpieces attached to a pallet 3 are machined by the tool supported by main spindle head 2 of a machine tool 1. The pallet 3 is attached on a table 4. In order that the pallet 3 be movable leftwardly and rightwardly (X-axis direction) and upwardly and downwardly (Y-axis direction) as viewed in FIG. 1, the table 4 has a saddle 6 adapted to be movably guided by rails 5 in the Y axis direction on the bed of the machine tool 1 and a clamp base 8 adapted to be slidably guided by the rails 7 in the X axis direction provided at the saddle 6.

The saddle 6 may be reciprocably moved by such a driving means not shown as a motor with a screw or hydraulic cylinder or the like. The clamp base 8 is reciprocably moved by a ball-screw 9 (which may be a normal screw otherwise) driven by a motor not shown mounted on the saddle 6 and a nut 10 engaged with the ball-screw 9 and secured to the clamp base 8.

In the clamp base 8, there is provided a cylinder portion 11 in which a piston 12 is caused to move vertically by one hydraulic pressure. A clamp guide plate 13 is secured or integrally formed on the piston 12. The clamp guide plate 13 is so formed that it may be inserted in a guide groove 14 formed on the pallet 3. When the pallet 3 is to be exchanged, the guide groove 14 of a pallet 3 is caused to slide in relation to the clamp guide plate 13.

A plurality of or, for example, four of pins 15 are secured to the clamp base 8 at the predetermined locations and bores 16 for positioning are provided on the pallet 3 at the locations corresponding to the pins 15. When the pallet 3 is to be attached on the table 4, the piston 12 is caused to be lowered at a specified location as shown in the left half of FIG. 2 thereby lowering the pallet 3 and the bores 16 for positioning may be held at such a condition as to engage with the pin 15. At this time, the clamp guide plate 13 also urges the pallet 3 against the clamp base 8 by way of the guide groove 14.

If the pallet 3 is to be exchanged, the piston 12 is caused to ascend and the pallet is replaced while it is supported by the clamp guide plate 13.

Figure 4:
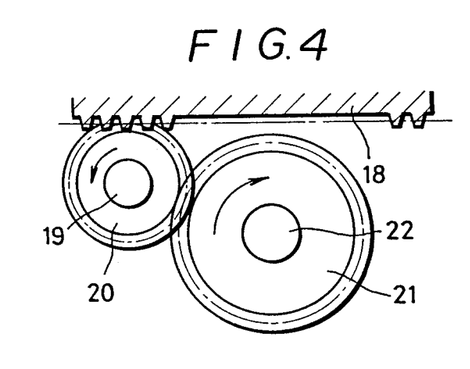
FIG. 4 is the plan view as seen from the right side elevation in FIG. 3.

A transmission device 17 includes a rack 18 secured to a member such as a saddle 6 as is stationary during exchanging the pallets, an idle gear 20 in meshing engagement with the rack 18 and rotatably carried by a shaft 19 fixed to the clamp base 8 as shown in FIG. 2 and FIG. 4 and an output gear 21 in meshing engagement with the idle gear 20. The output gear 21 is secured to an output shaft 22 rotatably and axially movably supported by the clamp base 8. The output gear 21 is so constructed in order for the axial movement of the output gear 21 in itself to cause the idle gear 20 also to axially move that side plates 21a are provided to sandwich the idle gear 20.

To the output shaft 22 is secured a catch plate 23 which is so shaped as to engage with a side groove 24 formed at the side surface of the pallet 3. Vertical movement of the pallet will cause the output shaft 22 to move vertically through engagement between the side groove 24 and the catch plate 23.

When the pallet 3 is to be replaced, the pallet is in the lifted position while the output shaft 22 and output gear 21 as well as the idle gear 20 are also in the lifted position. At such lifted positions, since the idle gear 20 is in meshing engagement with the rack 18, if the clamp base 8 constituting the table 4 for shifting the pallet 3 is moved, this movement causes the output gear 21 or the output shaft 22 to rotate.

In order to facilitate easy engagement of the catch plate 23 with the side groove 24 of the pallet 3 next to be attached even after the pallet 3 has left the table, the spring 25 which is provided between the catch plate 23 and the clamp base 8 or the sleeve 8a attached to the clamp base 8 will cause the catch plate 23 or the output shaft 22 to be held at the specififed lifted position.

When the pallet 3 is lowered at the specified position and clamped on the clamp base 8, the output shaft 22 is also lowered together with the catch plate 23 and the output gear 21 as well as the idle gear 20 are also lowered at the position shown by the phantom line. At this time, the idle gear 20 is in meshing engagement with the rack 18. In this way, even if the clamp base 8 is moved, the output shaft will not rotate.

To the output shaft 22 of the transmission apparatus is secured lever arm 27 constituting the speed-up device 26. A free end of the lever arm 27 has a roller 29 slidable in a connecting groove 28 formed at one end portion of the pallet 3 and extending in the direction crossing the direction of the movement of a pallet at the time of replacement of the pallet or the Y axis direction.

Replacement of the pallet takes place after the pallet 3 has been clamped on the table 4 and the workpiece has been lowered to a specified position. When the pallet is to be exchanged, the piston 12 is activated to lift the pallet 3 so that engagement between the pin 15 and the bore 16 for positioning may be released. At this time uplifting of the pallet 3 causes the catch plate 23 to be correspondingly lifted and the lever arm 27 and the output gear 21 are also lifted so as to permit the idle gear 20 to engage with the rack 18. At this instance, the pallet 3 and the clamp base 8 are located at the positions shown by the solid line in FIG. 1. At the time of exchanging the pallet the clamp base 8 is moved to the right side of FIG. 1 by rotation of the ball-screw 9 from the position shown by the solid line.

As the clamp base 8 is shifted, the shaft 19 will be shifted accordingly, so that the idle gear 20 is caused to be rotated anti-clockwise in FIG. 4 and rolled along the rack 1. Rotation of the idle gear 20 leads to rotation of the output gear 21 and the output shaft 22 will be thereby rotated clockwise. Rotation of the output shaft 22 is transmitted to the lever arm 27 of the speed-up device 26 in the form of clockwise rotation. The lever arm 27 is caused to move in the rightward direction in FIG. 1 to the position shown by the phantom line in respect of the supporting position by the distance corresponding to the movement of the clamp base 8 and during that movement, the lever arm 27 is caused to be rotated by about 180 degrees at a speed-up rate in the clockwise direction. Rotation of the lever arm 27 also causes, in addition to displacement of the supporting position of the lever arm 27, the pallet 3 to be shifted rightwardly in FIG. 1 by the distance equivalent to two times of the linear length of said lever arm. The length of the lever arm 27 mauy be so suitably selected that a slight shifting of the clamp base 8 permits the pallet 3 to be shifted to the predetermined waiting position positioned completely outside of the table.

It is to be seen from FIG. 1 that after the pallet loaded with the machined workpieces has been shifted to a first waiting position A, the roller 29 of the lever arm 27 is caused to move along the connecting groove 28 of the pallet 3 currently placed at the first waiting position A by shifting the table 4 or for example the saddle 6 in the direction of Y axis and then come out of the connecting groove, thereby releasing connection between the lever arm 27 and the pallet 3. Further movement of the table 4 causes the roller 29 of the lever arm 29 to engage with the connecting groove 28 of the pallet 3 loaded with the workpieces to be machined which is waiting at a second waiting position B, so that the lever arm 27 and the pallet 3 may be coupled. After this coupling has taken place, when the clamp base 8 is leftwardly moved as seen from FIG. 1, the idle gear 20 will be rotated in the direction opposite to the arrow in FIG. 4 or clockwise and caused to roll along the rack 18. This rotation of the idle gear 20 causes the lever arm 27 to be rotated in the anti-clockwise direction so that the pallet 3 may slide over the clamp base 8 and the clamp plate 13 may be fitted in the guide groove 14 of the pallet 3. When the clamp base 8 has arrived at the specified position, the piston 12 is activated so that the clamp plate 13 may be lowered and the pallet 3 may be held with the pin 15 engaged with the bore 16 for positioning.

Figure 5:
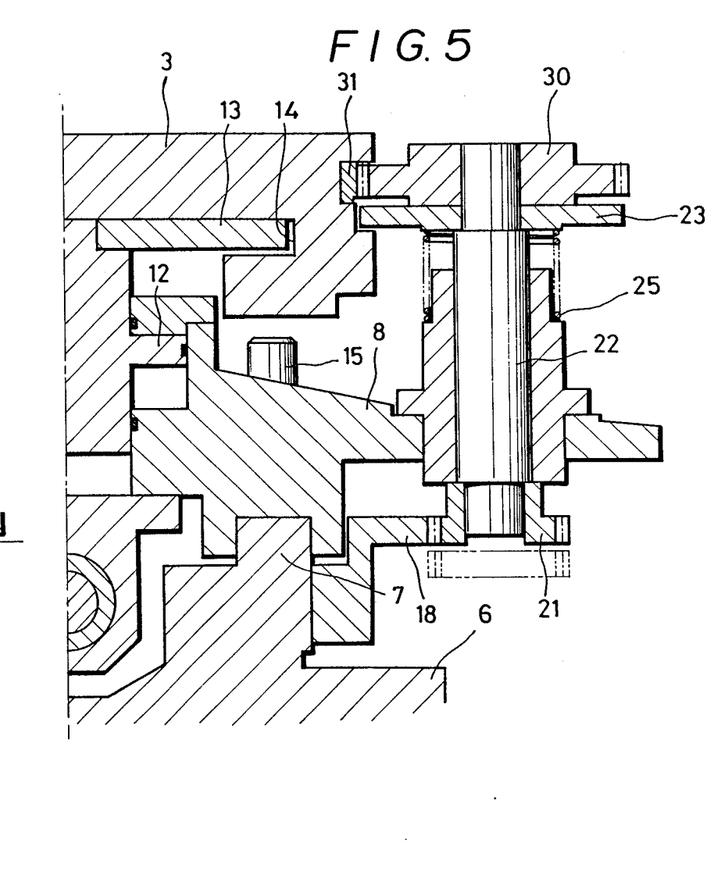
FIG. 5 is the view corresponding to FIG. 2 showing a further embodiment.

A modified embodiment as shown in FIG. 5 may be incorporated in the transmission 17 and the speed-up device 26. In FIG. 5, the idle gear 20 has been omitted and the output gear 21 may be engageable directly with the rack 18. While in FIG. 1 the lever arm 27 has been used as a part of the speed-up device 26, in the embodiment shown in FIG. 5, the speed-up device comprises a gear 30 fixed to the output shaft 22 and a rack 31 adapted to mesh with the gear 30 and secured to the pallet 3. Speed-up function and stroke extending function may be attained by increasing the number of teeth of the gear 30 in relation to the output gear 21.

Figure 6:
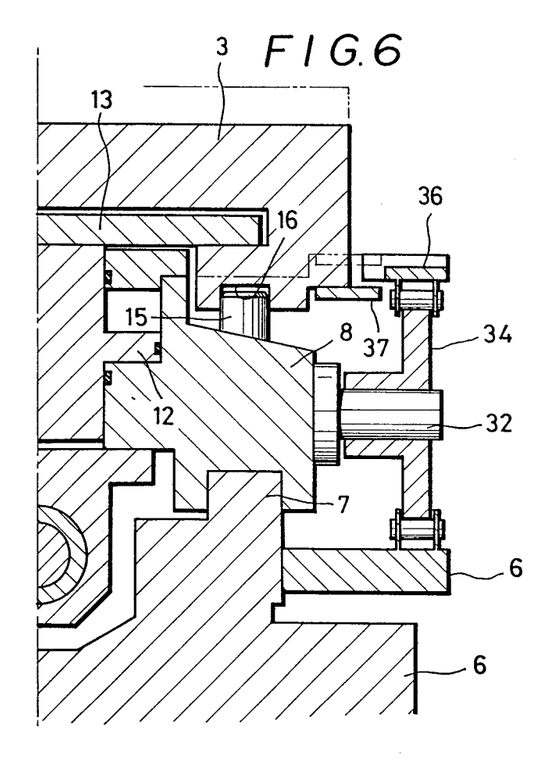
FIG. 6 is the view corresponding to FIG. 2 showing still another embodiment.
Figure 7:
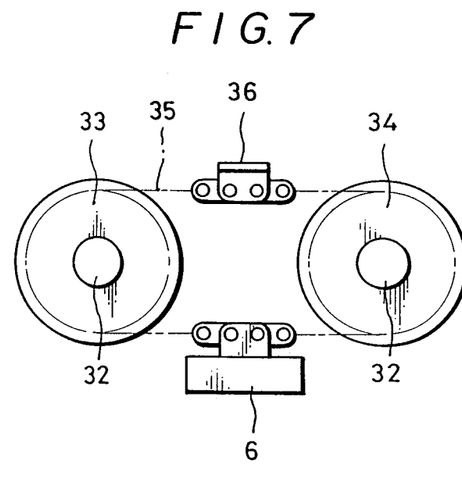
FIG. 7 is the right side elevation of the transmission device and the part of a speed-up device in FIG. 6.

A further embodiment of the transmission device 17 and the speed-up device 26 is as shown in FIG. 6 and FIG. 7. This embodiment comprises sprockets 33, 34 rotatably supported respectively on two shafts 32 fixedly mounted to the clamp base 8 and a chain 35 wound around the sprockets 33, 34. A part of the chain 35 is fixed to the saddle 6. At another position of the chain 35 is secured an engaging member 36 such as a chain plate having a recess, and a claw member 37 engageable with the engaging member such as for example a plate member having a projection insertable into the recess of the chain plate is fixed to the pallet 3.

When the workpiece or the workpieces on the pallet 3 are to be machined, the pallet 3 loaded with such workpieces is at the lowered position and since the claw member 37 is disengaged from the engaging member 36, even if the clamp base 8 is moved and the sprockets 33, 34 are rotated, the pallet 3 will not be affected at all.

When the pallet is to be exchanged, and the pallet 3 is lifted up, the claw member 37 will come into engagement with the engaging member 36. In this condition, if the clamp base 6 is shifted, the sprockets 33, 34 are caused to be shifted together with the clamp base 8. Since the chain 35 is secured to the saddle 6, the sprockets 33, 34 are caused to be rotated as the clamp base 8 is moved. The engaging member 36 of the chain 35 is caused to be shifted in the direction of movement of the clamp base 8 by the rate two times as high as the movement of the clamp base 8 or the combined movements of the linear movement of the sprockets 33, 34 themselves and the rotational movement of the sprockets 33, 34. Since the engaging member 36 is connected to the pallet 3 by means of the claw member 37, the pallet 3 may be moved two times as fast as the clamp base 8. The movable range of the clamp base 8 should be so selected that the pallet 3 may be moved out of the clamp base to the waiting position.

Figure 8:
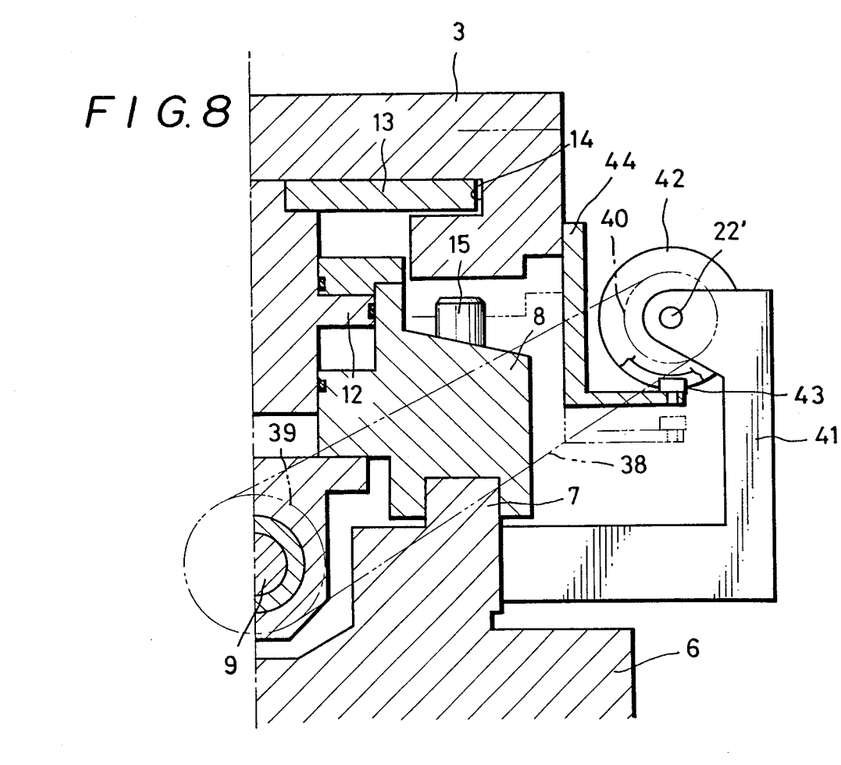
FIG. 8 is the view corresponding to FIG. 2, showing a still further embodiment.

A still further embodiment as shown in FIG. 8 may be employed for the transmission 17 and the speed-up device 26. In FIG. 8, rotation of the ball-screw 9 is used to rotate sprockets 39, 40 through a chain 38 and the rotation transmission such as belts and pulleys or gear trains, etc. are utilized as the transmission 17. The sprocket 40 is secured to the clamp base 8. To an output shaft 22' is secured a cam 42 such as a cylindrical cam. A roller 43 or a cam follower for the cam 42 is fixedly mounted to the pallet 3 through a bracket 44. The speed-up device 26 is made up of the cam 42 and the cam follower 43.

When the pallet 3 is lowered upon machining the workpieces, the cam follower 43 is moved out of the cam 42 and even if the ball-screw 9 is rotated, the pallet 3 will not be affected at all.

Upon exchanging the pallet, the pallet 3 is lifted up while at the same time the cam follower 43 is raised to come into engagement with the cam groove of the cam 42. When the clamp base 8 is shifted, rotation of the ball-screw 9 will be transmitted to the cam 42 by way of the output shaft 22'. The shifting speed of the pallet 3 may be appropriately speeded up in relation to the shifting speed of the clamp base 8 by selecting the number of teeth of the sprockets 39, 40 and the feed or pitch per revolution of the cam groove of the cylindrical cam 42 in accordance with the rpm of the ball-screw 9 relative to a specified shifting amount of the clamp base 8. In addition, the shifting amount of the pallet 3 may be readily selected by suitably selecting the length of the cam 42.

It is to be noted that compared to the embodiments shown in FIG. 5 through FIG. 8 in which a manual or separate pallet shifting means is required for connecting the pallet loaded with the machined workpieces and the pallet loaded with the workpieces still to be machined to the speed-up device, the embodiment shown in FIG. 1 has such an advantage as movement of the table may be utilized for exchanging and connecting the pallet.

What is claimed is:

1. A pallet exchanging apparatus for a machine tool in which the pallet loaded with the machined workpieces and placed on the table of said machine tool is exchanged with the pallet loaded with the workpieces to be machined and placed at the waiting position, comprising a transmission device connected to either of the table and the means for driving said table and adapted to output rotational movement and a speed-up device connected to said transmission device and adapted to provide said pallet with the linear movement with higher speed and larger stroke than those of the linear movement of said table, said transmission device comprising a rack secured to a stationary member, an output gear operatively connected to said rack and a shaft rotatably and axially movably operatively supported by said table for supporting said output gear and for connecting with said speed-up device and said speed-up device comprising a lever arm secured to said output shaft and a roller supported by said lever arm and being engageable with the pallet.

* * * * *